United States Patent
Jayaraman

(10) Patent No.: US 12,100,019 B2
(45) Date of Patent: Sep. 24, 2024

(54) SYSTEM FOR FORMING A CONNECTION BETWEEN A USER COMPUTING DEVICE AND A SERVER COMPUTER

(71) Applicant: Truist Bank, Charlotte, NC (US)

(72) Inventor: Barath Jayaraman, Fort Mill, SC (US)

(73) Assignee: TRUIST BANK, Charlotte, NC (US)

( * ) Notice: Subject to any disclaimer, the term of this patent is extended or adjusted under 35 U.S.C. 154(b) by 25 days.

(21) Appl. No.: 18/149,473

(22) Filed: Jan. 3, 2023

(65) Prior Publication Data

US 2024/0221024 A1 Jul. 4, 2024

(51) Int. Cl.
*G06Q 30/02* (2023.01)
*G06Q 20/10* (2012.01)
*G06Q 20/32* (2012.01)
*G06Q 30/0207* (2023.01)

(52) U.S. Cl.
CPC ....... *G06Q 30/0239* (2013.01); *G06Q 20/108* (2013.01); *G06Q 20/3221* (2013.01)

(58) Field of Classification Search
CPC .............. H04L 9/3236; G06Q 20/405; G06Q 30/0282; G06Q 10/06393
See application file for complete search history.

(56) References Cited

U.S. PATENT DOCUMENTS

| | | | |
|---|---|---|---|
| 8,793,255 B1* | 7/2014 | Bilinski | G06Q 10/06393 707/740 |
| 2012/0066050 A1* | 3/2012 | Satyavolu | G06Q 40/00 705/14.27 |
| 2014/0188886 A1* | 7/2014 | Mahaffey | G06F 16/904 707/740 |
| 2018/0011855 A1* | 1/2018 | Shuvali | G06Q 30/0282 |
| 2018/0060434 A1* | 3/2018 | Fu | G06Q 50/01 |
| 2022/0156723 A1* | 5/2022 | Lovato | H04L 9/3236 |
| 2023/0099864 A1* | 3/2023 | Vukich | G06Q 20/405 705/44 |

* cited by examiner

*Primary Examiner* — Saba Dagnew
(74) *Attorney, Agent, or Firm* — Michael A. Springs, Esq.; Shumaker, Loop & Kendrick, LLP; Patrick B. Horne

(57) ABSTRACT

A method and system for computing a score and achievement level for system users based on actions that the users perform in corresponding applications and systems. An algorithm calculates and tracks a score for each user, where the score is incremented by a prescribed number of points for each action performed by the user in the systems. The point value of each action is dependent upon the type of action and other factors including how many times, and when, the user has previously performed the same type of action. Each user's score is converted to a system usage level. The score and level are displayed to the user in the system, along with tips for how to earn more points and how to achieve a level upgrade. Rewards or incentives may be attached to achievement of certain scores and/or levels.

11 Claims, 4 Drawing Sheets

SYSTEM FOR FORMING A CONNECTION BETWEEN A USER COMPUTING DEVICE AND A SERVER COMPUTER

FIELD

The present disclosure relates generally to the field of digital banking systems, and more particularly to a method and system for assignment of an attribute value, such as a score or an achievement level, to individual digital banking customers based on the quantity and types of actions that the individual customers perform in certain digital banking applications and systems.

BACKGROUND

Digital banking systems are well known and used by many bank businesses and their customers. Two common types of digital banking systems are online web-based systems which interact with a user via a web browser window, and mobile applications ("apps") which run on mobile devices such as smart phones and tablets. Both online web-based banking systems and mobile banking apps communicate with back-end servers which validate and execute specific transactions, provide data for display, etc. Both web-based and mobile app-based systems also include security and customer authentication features, where user-provided information and/or biometric information is collected from the customer and validated with data stored on the back-end server.

Bank businesses typically desire that their customers use digital banking systems for as many of the customers' banking needs as possible. Types of transactions which can be performed in digital banking systems include depositing checks, transferring funds between accounts, paying bills, and many others. When bank customers perform more of these types of transactions using digital banking systems, there is less need for the customers to visit bank branch offices or to call or email the bank, which ultimately leads to a reduction in demand for additional branch offices, and a reduction in the number of resources needed in the bank's offices. Both of these outcomes represent efficiency improvements and cost reductions for the bank business.

At the same time, customers who do more of their banking using digital banking systems also realize benefits—including minimizing the need to drive to bank branch offices, which saves the customers time and money. Additionally, many of today's bank customers are "tech savvy" and are very comfortable using web-based systems and mobile apps to simplify and streamline their lives. These types of customers have a natural desire to know that they are using the available digital banking system features to the maximum level of efficiency and effectiveness.

In spite of the benefits to both bank businesses and their customers associated with increased use of digital banking systems, until now there has not been a structured and intuitive technique for communicating a digital banking systems usage metric to each customer and incentivizing each customer to improve upon their usage metric.

In view of the circumstances described above, there is a need for a score-based metric calculation tool which can be used to track and encourage customers' digital banking systems usage.

BRIEF SUMMARY

The present disclosure describes a method and system for computing a score and/or an achievement level for individual digital banking customers based on the quantity and types of actions that the individual customers perform in certain digital banking applications and systems. An algorithm calculates and tracks a score for each digital banking customer, where the score is incremented by a prescribed number of points for each action performed by the customer in a web-based online banking system or a mobile app-based digital banking system. The point value of each action is dependent upon the type of action and other factors including how many times, and when, the customer has previously performed the same type of action. Each customer's score is converted to a digital banking systems usage level. The score and level are displayed to the customer in the web-based or app-based system, along with tips for how to earn more points and how to achieve a level upgrade. Rewards or incentives may be attached to achievement of certain scores and/or levels. The actions are initiated by the user on a user computing device such as a mobile phone or a personal computer, and the score tracking is performed on a server computer.

The features, functions, and advantages that have been discussed may be achieved independently in various embodiments of the present disclosure or may be combined in yet other embodiments, further details of which can be seen with reference to the following description and drawings, along with the appended claims.

BRIEF DESCRIPTION OF THE DRAWINGS

Figure 1:
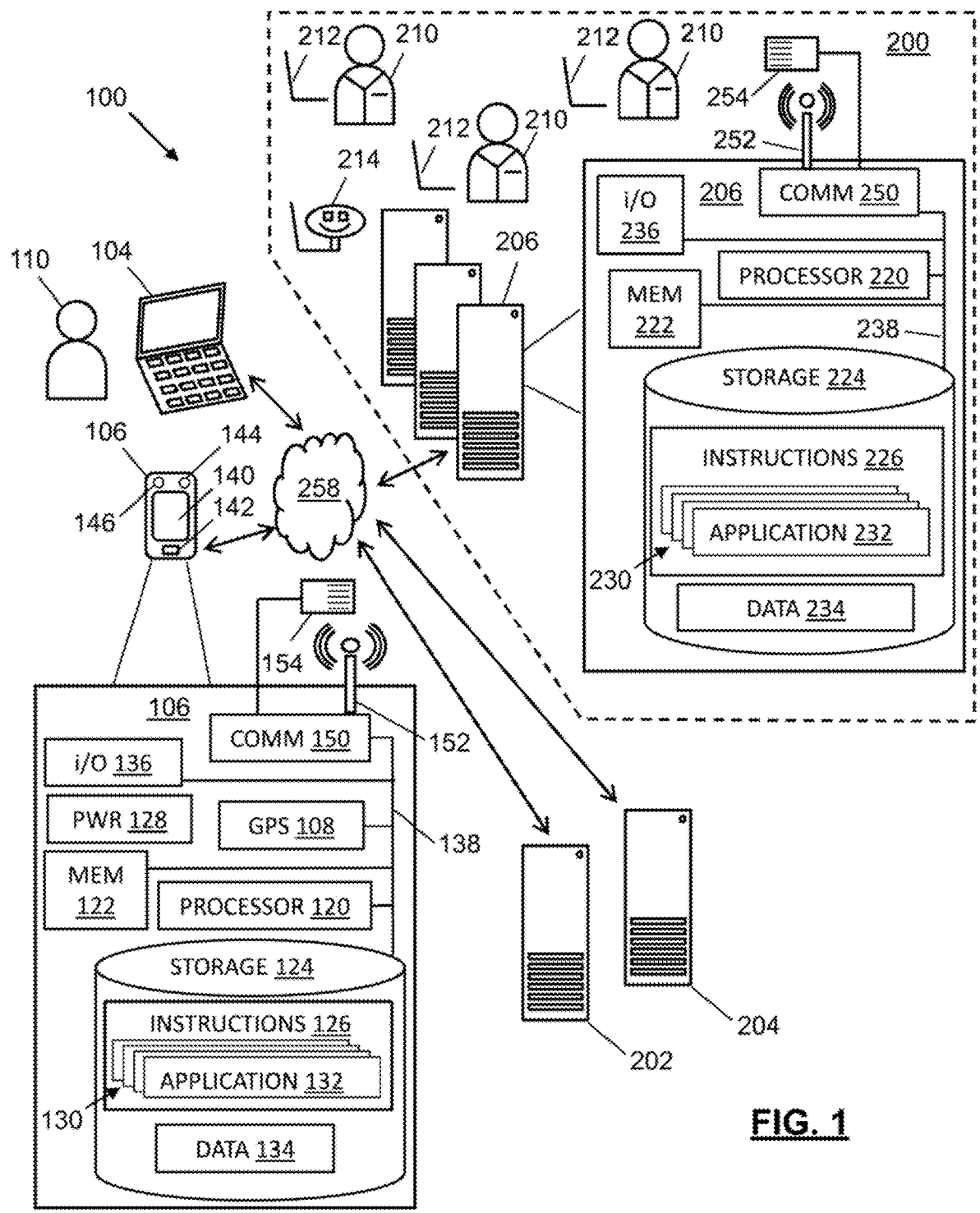
Figure 2:
Figure 3:
Figure 4:
Figure 5:
Figure 6:
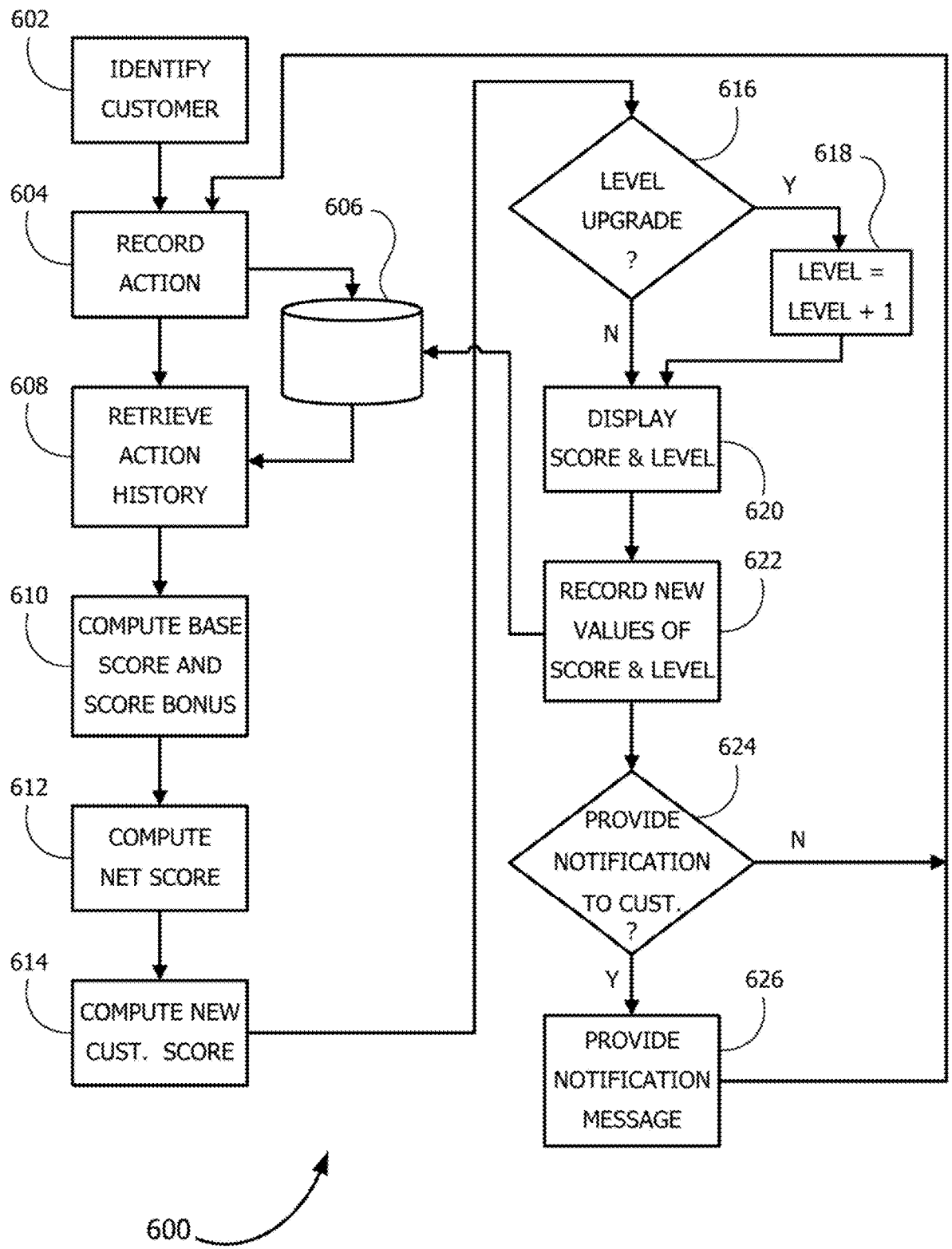

Having thus described embodiments of the invention in general terms, reference will now be made to the accompanying drawings, wherein:

FIG. 1 illustrates an enterprise system, and environment thereof, according to at least one embodiment of the present disclosure;

FIG. 2 is a mock-up illustration of a display screen of a mobile device running a digital banking application, depicting several types of transactions that a customer may execute, according to an embodiment of the present disclosure;

FIGS. 3-5 are mock-up illustrations of display screens of the mobile device of FIG. 2, depicting different communications regarding hints, scores and level status which may be displayed to a customer running a digital banking application, according to an embodiment of the present disclosure; and FIG. 6 is a flowchart diagram of a method for computing a digital banking score and usage level for a customer, according to an embodiment of the present disclosure.

DETAILED DESCRIPTION OF EMBODIMENTS

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms "coupled," "fixed," "attached to," "communicatively coupled to," "operatively coupled to," and the like refer to both (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

Embodiments of the present invention described herein, with reference to flowchart illustrations and/or block diagrams of methods or apparatuses (the term "apparatus" includes systems and computer program products), will be understood such that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

FIG. 1 illustrates a system 100 and environment thereof, according to at least one embodiment, by which a user 110 benefits through use of services and products of an enterprise system 200. The user 110 accesses services and products by use of one or more user devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, IOS, Android and any other known operating system used on personal computers, central computing systems, phones, and other devices.

The user 110 can be an individual, a group, or any entity in possession of or having access to the user device, referring to either or both of the mobile device 104 and computing device 106, which may be personal or public items. Although the user 110 may be singly represented in some drawings, at least in some embodiments according to these descriptions the user 110 is one of many such that a market or community of users, consumers, customers, business entities, government entities, clubs, and groups of any size are all within the scope of these descriptions.

The user device, as illustrated with reference to the mobile device 106, includes components such as, at least one of each of a processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, user input devices and user output devices, which are operatively coupled to the processing device 120. The user output devices include a display 140 (e.g., a liquid crystal display or the like), which can be, as a non-limiting example, a touch screen of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, and/or other input device(s). The user interface may also include a camera 146, such as a digital camera.

Further non-limiting examples include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The mobile device 106 may also include a positioning device 108, which can be for example a global positioning system device (GPS) configured to be used by a positioning system to determine a location of the mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device. As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, iOS, Android, and any known other operating system used on personal computer, central computing systems, phones, and other devices.

The user devices, referring to either or both of the mobile device 104 and computing device 106, the agent devices 212, and the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

Two external systems 202 and 204 are illustrated in FIG. 1, representing any number and variety of data sources, users, consumers, customers, business entities, banking systems, government entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third party systems such as merchant systems configured to interact with the user device 106 during transactions and also configured to interact with the enterprise system 200 in back-end transactions clearing processes.

In certain embodiments, one or more of the systems such as the user device 106, the enterprise system 200, and/or the external systems 202 and 204 are, include, or utilize virtual resources. In some cases, such virtual resources are considered cloud resources or virtual machines. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

As used herein, an artificial intelligence system, artificial intelligence algorithm, artificial intelligence module, program, and the like, generally refer to computer implemented programs that are suitable to simulate intelligent behavior (i.e., intelligent human behavior) and/or computer systems and associated programs suitable to perform tasks that typically require a human to perform, such as tasks requiring visual perception, speech recognition, decision-making, translation, and the like. An artificial intelligence system may include, for example, at least one of a series of associated if-then logic statements, a statistical model suitable to map raw sensory data into symbolic categories and the like, or a machine learning program. A machine learning program, machine learning algorithm, or machine learning module, as used herein, is generally a type of artificial intelligence including one or more algorithms that can learn and/or adjust parameters based on input data provided to the algorithm. In some instances, machine learning programs, algorithms, and modules are used at least in part in implementing artificial intelligence (AI) functions, systems, and methods.

Artificial Intelligence and/or machine learning programs may be associated with or conducted by one or more processors, memory devices, and/or storage devices of a computing system or device. It should be appreciated that the AI algorithm or program may be incorporated within the existing system architecture or be configured as a standalone modular component, controller, or the like communicatively coupled to the system. An AI program and/or machine learning program may generally be configured to perform methods and functions as described or implied herein, for example by one or more corresponding flow charts expressly provided or implied as would be understood by one of ordinary skill in the art to which the subjects matters of these descriptions pertain.

A machine learning program may be configured to implement stored processing, such as decision tree learning, association rule learning, artificial neural networks, recurrent artificial neural networks, long short term memory networks, inductive logic programming, support vector machines, clustering, Bayesian networks, reinforcement learning, representation learning, similarity and metric learning, sparse dictionary learning, genetic algorithms, k-nearest neighbor (KNN), and the like. In some embodiments, the machine learning algorithm may include one or more image recognition algorithms suitable to determine one or more categories to which an input, such as data communicated from a visual sensor or a file in JPEG, PNG or other format, representing an image or portion thereof, belongs. Additionally or alternatively, the machine learning algorithm may include one or more regression algorithms configured to output a numerical value given an input. Further, the machine learning may include one or more pattern recognition algorithms, e.g., a module, subroutine or the like capable of translating text or string characters and/or a speech recognition module or subroutine. In various embodiments, the machine learning module may include a machine learning acceleration logic, e.g., a fixed function matrix multiplication logic, in order to implement the stored processes and/or optimize the machine learning logic training and interface.

One type of algorithm suitable for use in machine learning modules as described herein is an artificial neural network or neural network, taking inspiration from biological neural networks. An artificial neural network can, in a sense, learn to perform tasks by processing examples, without being programmed with any task-specific rules. A neural network generally includes connected units, neurons, or nodes (e.g., connected by synapses) and may allow for the machine learning program to improve performance. A neural network may define a network of functions, which have a graphical relationship. As an example, a feedforward network may be utilized, e.g., an acyclic graph with nodes arranged in layers.

Having described an enterprise computing environment as might be used by a banking business, and general characteristics of systems which may be employed in the enterprise computing environment, attention is now turned to the topic of computing customer scores and usage levels in connection with digital banking.

Digital banking systems are well known and used by many bank businesses and their customers. Two common digital banking systems are online web-based systems which interact with a user via a web browser window, and mobile applications ("apps") which run on mobile devices such as tablets and smart phones. Both online web-based banking systems and mobile banking apps communicate with back-end servers which validate and execute specific transactions, provide data for display, etc.

Types of transactions which can be performed in digital banking systems include depositing checks, transferring funds between accounts and paying bills, among others. When bank customers perform these types of transactions using digital banking systems, there is less need for the customers to visit bank branch offices, which ultimately leads to a reduction in demand for additional branch offices, and a reduction in the number of resources needed in the branch offices. Both of these outcomes represent efficiency improvements and cost reductions for the bank business, which is an incentive for bank businesses to provide well-designed full-function digital banking systems for their customers' use.

At the same time, customers who do most of their banking using digital banking systems also realize benefits—including minimizing the need to drive to bank branch offices, which saves the customers time and money. Additionally, many of today's bank customers are "tech savvy" and are very comfortable using web-based systems and mobile apps to simplify and streamline their lives. These types of customers have a natural desire to know that they are using the available digital banking system features to the maximum extent of efficiency and effectiveness.

FIG. 2 is a mock-up illustration of a display screen of a mobile device running a digital banking application, depicting several types of transactions that a customer may execute, according to an embodiment of the present disclosure. The mobile device 300 of FIG. 2 corresponds with the device 106 of FIG. 1, and it is to be understood that the mobile device 300 communicates with a back-end server such as the computing system 206 of FIG. 1, by way of communications channels such as WiFi and/or cellular communication networks as illustrated by the network 258 ("the cloud") of FIG. 1.

The mobile device 300 has a display screen 310 which serves as an input/output (I/O) device and user interface for user interaction with applications (apps) which run on the device 300. In FIG. 2, a simplified mock-up of a digital banking app is shown. On the screen depicted in FIG. 2, a list of actions or transactions 320 are available for selection.

FIG. 2 is merely a mock-up of a screen such as a home screen of the mobile banking app, showing the list of transactions 320 as a top-to-bottom list of selectable items. However, as would be understood by those skilled in the art, the transaction options may displayed in various other formats—including menu items or "tabs" positioned at the top and/or bottom of the display screen, a grid of boxes, or combinations of any of the above. The manner of displaying the transaction options is irrelevant to the presently disclosed techniques for score-based digital banking usage calculation.

The list of transactions 320 shown in FIG. 2 may also be accessed by a customer using a web-based online banking system, rather than a mobile device running an app. In the case of a web-based online banking system, the customer uses a web browser on a desktop or laptop computer or tablet device (shown as the computing device 104 in FIG. 1) to log into and access the features of the digital banking systems.

As would be known by those skilled in the art, before a customer is allowed to access a web-based or mobile app-based digital banking systems, the customer must login or authenticate into the system. The authentication process may require the user to provide a password, and/or may collect biometric data such as facial recognition or a fingerprint scan. Two-factor authentication is sometimes used for additional security.

The list of transactions 320 shown in FIG. 2 illustrates several options which may be available to a customer after the customer logs into the mobile banking app. Each of the options depicted on FIG. 2 represents one or more type of action or transaction that may be executed. These transactions are known by those skilled in the art and familiar with digital banking systems. "View Accounts" allows the customer to view any accounts the customer has with the bank business, such as savings, checking and credit cards, check balances in accounts, and also view individual entries (purchases, deposits, etc.) in each account. "Make Transfers" allows the customer to transfer funds from one account to another. Zelle® is a payment service which enables individuals to electronically transfer money from their bank account to another registered user's bank account using the digital banking app illustrated in FIG. 2. "Pay Bills" allows the customer to make a one-time or regular payment, such as a mortgage payment or a utility bill payment, using funds from one of the customer's accounts. The "Deposit Checks" transaction is self-explanatory. "Trade" enables a customer to buy or sell securities using funds from one of the customer's account.

As outlined above, digital banking systems are currently available which enable customers to perform most of their day-to-day banking transactions digitally rather than in person at a branch office, and both the bank businesses and the customers have an incentive to increase the percentage of actions and transactions which are performed using the digital banking systems. However, until now, banks have had to rely on indirect techniques for encouraging customers to use digital banking systems. For example, telephone voice response systems, and bank tellers, may inform customers that "this type of transaction could be performed using our app". Advertising has also been used to educate customers about the capabilities of web-based and app-based digital banking systems, and to suggest the use of these systems.

The present disclosure provides a digital banking system with a built-in score-based incentive tool designed to actively encourage customers to use the bank business's web-based and app-based banking systems to the maximum extent possible. The system computes and tracks a digital banking score for each customer based on the numbers and types of transactions that the customer performs using the digital banking systems, and provides status updates, hints and other communications based on each customer's individual situation. Details of the system are discussed below. Throughout this discussion, the terms "action" and "transaction" are used to denote actions the customer takes in the digital banking systems—including true transactions where funds are deposited, withdrawn or moved, along with other non-transactional actions such as viewing statements and checking account balances.

The basic premise of the presently disclosed technique is to compute a digital banking score for each customer based on the actions and transactions the customer performs in the bank's web-based and app-based systems, and convert the score into a "digital banking level" (essentially an achievement level) for the customer. In general, each type of action or transaction earns a certain number of points which are added to the customer's digital banking score. A more complex or sophisticated transaction such as an international wire transfer accrues more points than a simple action such as viewing a statement, for example.

Other types of transactions, besides those illustrated in FIG. 2, may also be offered in certain digital banking applications, and this may include transaction sub-types. For example, "Pay Bills" may include sub-options such as setting up a regular monthly bill payment (e.g., for a car loan), making a one-time bill payment on a credit card, and setting up a new bill payee, where each of these sub-options may be treated as a different type of transaction for the purposes of score augmentation.

The following discussion is relative to one particular customer ("the customer") of the bank business. It is to be understood that the score accrual and level tracking discussed below is performed for each customer of the bank business who uses the web-based and app-based digital banking systems.

As mentioned above, different point values are awarded for different types of transactions. Many different parameters, besides the transaction type itself, may be factored into the actual point value awarded for a particular transaction. These parameters include, but are not limited to, how many times the customer has used the particular transaction type, how much time has elapsed since the transaction type has been used, detection of certain combinations of transaction types, overall usage of the web-based and app-based digital banking systems by the customer, and others.

In one example, a first usage of a particular transaction type (e.g., a transfer from one account to another in the app) by the customer might accrue ten points, and subsequent digital transfers might accrue five, or two, etc. If the customer goes for a certain period of time without using the transaction type, then uses it again, this might reset the point value to a higher level for the first usage after the lapse. Many different rules can be implemented relating to quantity and frequency of usage of each individual transaction type.

The overall quantity of transactions the customer performs in the digital banking systems can also affect point values. For example, if the customer averages several transactions per day for a week, counting all transaction types, this quantity of usage could be rewarded with a point bonus which is irrespective of the particular types of transactions. Likewise, the first few transactions that the customer performs in the app-based system, for example, may be rewarded with bonus points, to encourage continued use of the app by the customer. Similarly, if the customer has a lapse in usage of the digital banking systems (e.g., for a month or more), then a point bonus could be awarded when the customer once again uses the app. Again, many different rules can be implemented relating to the customer's overall usage of the web-based and app-based digital banking systems.

The number of different types of transactions is also a consideration, where more types leads to a better score. For example, if the customer performs five different types of transactions within a seven day period of time, this could be acknowledged with a points bonus. A checklist of transaction types could also be built into the digital banking systems, and the customer would be awarded bonus points for performing each of the transactions on the checklist at least once, irrespective of time. The checklist could be displayed to the customer from time to time, so the customer sees which transaction types still need to be performed in order to complete the checklist. Many such checklists could be created—including checklists which are specific to a particular umbrella transaction type such as transfers—in which case the checklist would include transfers between the customer's own accounts, domestic transfers to others' accounts at the same bank or a different bank, and international wire transfers, for example.

Similar to the checklist concept, combinations of transactions can be designated which collectively earn more than their individual values. For example, enrolling in Zelle® could be assigned a score of ten, setting up a Bill Pay also a score of ten and enrolling in paperless earning a score of 20. If the customer is enrolled in all three, the customer could be awarded 50 points (a bonus of 10) rather than 40.

The overall amount of time the customer has been actively using the web-based and/or app-based systems can also be factored into points accrual. For example, if the customer has performed at least one transaction every 15 days for the past three months (or six months, one year, etc.), these milestones could be rewarded with bonus points. This type of longevity could also be used to determine a multiplier for other transaction points values.

Score boosts could also come from other sources—including transactions and queries originating from third-party apps such as budget planning and credit score tracking systems. Still other types of actions and transactions could be used to trigger points being awarded to the customer.

The examples mentioned above are merely illustrative of the types of considerations which may factor into the customer's score. Actual point values for particular transaction types, and combinations, etc., may be defined to suit the bank business's goals.

As discussed earlier, the digital banking systems keep track of the digital banking score for the customer (for each individual customer of the bank business), and the score typically only goes up over time. The customer's digital banking score can be translated to a digital banking systems usage level (e.g., Level 1, Level 2, etc.). For example, a new customer may begin at Level 0, and the customer would then be upgraded to Level 1 when he or she reaches 100 points. The customer's digital banking level is communicated to the customer, and may trigger other actions. For example, the graphical design of the web system or app may change to something more ornate when the customer reaches a higher level. The digital banking level may be used in determining the customer's overall status level with the bank (i.e., Silver, Gold, Platinum), where the customer's overall status level with the bank corresponds with certain rewards and privileges (e.g., free checks, free wire transfers, zero annual fee credit card).

Certain rewards and incentives may be directly provided to the customer as a result of achieving a higher digital banking level. For example, when the customer reaches Level 2, a set of offers and promotions could be electronically delivered to the customer (such as discounts at certain establishments). Also, the customer's digital banking score or level could earn benefits such as waiving certain fees, or allowing more non-native ATM withdrawals in a month without incurring a fee. The customer's digital banking score could also be treated like currency and converted to cash, goods or services. In other words, 100 points of the customer's score could be "spent" to buy an item having a certain value. Many different types of rewards and incentives can be designed and implemented in connection with the customer's digital banking level (or score). The intention is to encourage the customer's continued use of the digital banking systems.

Notwithstanding the discussion above, the customer's digital banking score and level need not necessarily be converted to benefits or rewards to the customer. Rather, the score and the level may be treated as incentives in and unto themselves, as they are aspirational values which the customer will inherently desire to improve, to know that they are using the digital banking tools most effectively, and are savvy online customers.

In addition to the points accrual and level tracking described above, another aspect of the presently disclosed score-based digital banking system is the communication of status information, hints and motivational messages to the customer.

FIGS. 3-5 are mock-up illustrations of display screens of the mobile device 300, depicting different communications regarding hints, scores and level status which may be displayed to a customer running a digital banking application, according to an embodiment of the present disclosure. In FIG. 3, a hint or tip 310 is provided to the customer as a display element on the mobile device 300, suggesting a transaction that the customer could perform which would yield a desirable increase in the customer's digital score. In FIG. 4, a congratulatory notification 410 is provided to the customer on the mobile device 300, indicating that the customer has achieved a new digital banking level. In FIG. 5, a status notification 510 is provided to the customer on the mobile device 300, indicating the customer's current digital banking score and encouraging the customer to continue earning points.

The messages and notifications depicted in FIGS. 3-5 are merely exemplary, and many others can readily be envisioned. These tips, techniques and status messages regarding increasing score, reaching next level, etc., are selected and displayed based on analysis of the particular customer's history and current status. For example, if the customer only needs a few more points to achieve a level upgrade, this may trigger a communication which alerts the customer to the opportunity. Similarly, if the customer has a high-point-value transaction available to him/her, this could trigger a communication of the type shown in FIG. 3.

In addition to the notifications depicted and described above, the customer's digital banking score and level may always be displayed on the home screen and other screens of the web-based and app-based digital banking systems.

Some of the communication of hints, scores and level status may be made by way of push notifications to the customer's mobile device, instead of or in addition to the in-app pop-up messages depicted in FIGS. 3-5. In addition, a web-based digital banking system may also display hints and status messages of the types shown in FIGS. 3-5, where in the web-based system the messages would either be pop-ups in the browser window or would be incorporated into the current display of the browser window (as widgets, etc.).

The intention of the communications and notifications depicted in FIGS. 3-5 and described above is to provide feedback and motivation to the customer to encourage the customer to continue using the web-based and app-based digital banking systems to the fullest extent possible. As discussed earlier, customers' increased usage of digital banking systems is good for the banking business and is also good for the customers, thereby leading to more satisfied customers.

FIG. 6 is a flowchart diagram 600 of a method for computing a digital banking score and usage level for a customer, using the techniques discussed above, according to an embodiment of the present disclosure. At box 602, a customer using a web-based or app-based digital banking system is identified through a login or authentication step. At box 604, an action performed by the customer is recorded in a database 606. As described earlier, the action performed and recorded at the box 604 could be a true transaction (such as transferring funds from one account to another) or could be a non-transactional action (such as viewing a list of debit card purchases).

At box 608, the customer's action history is retrieved from the database 606, including a list of customer actions (action type, date, etc.), along with a current value of a customer digital banking score and a customer digital banking level. At box 610, a base score for the current customer action (the action recorded at the box 604) is computed, along with a score bonus if any. The base score and the score bonus are computed based on the type of action and the customer's action history. The base score is the number of points directly earned by the action—such as 10 points for a first-time setup of a bill pay, or 2 points for a recurrent use of a transfer from one of the customer's accounts to another. The score bonus, which might be zero, is the number of additional points earned by the action—such as a bonus for completing a checklist (e.g., three different types of fund transfers), or a bonus for performing a certain total number of actions in one week. At box 612, a net score for the current action is computed by adding the score bonus to the base score.

At box 614, a new value of the customer digital banking score is computed by adding the net score for the current action to the previous value of the customer digital banking score. At decision diamond 616, it is determined whether a level upgrade is achieved based on the new value of the customer score. If so, then the customer digital banking level is incremented by one at box 618. At box 620, the new value of the customer digital banking score and the customer digital banking level (which may or may not be greater than it was before the current action) are displayed to the customer in the web-based or app-based digital banking system. The customer's score and level may also be displayed on the web page or in the app at other times and locations—including after the customer first logs in. The step performed at the box 620 simply ensures that the updated values are displayed to the customer.

At box 622, the new value of the customer score and the customer level are recorded in the database 606. The customer level may only be written to the database 606 if the level was incremented at the box 618. At decision diamond 624, it is determined whether to provide a notification message to the customer based on the new value of the customer score, the customer level and/or the action history. As discussed earlier in connection with FIGS. 3-5, many different types of notification messages may be provided to the customer—including hints for earning score points, congratulations for achieving a higher level, score status and number of points needed for a level upgrade, and others. The criteria for determining whether to provide any such notification messages at the decision diamond 624 may be defined in any manner suitable to the banking business.

At box 626, if it is determined that a customer notification message is warranted, the notification message (or possibly more than one) is provided. The notification message may be a pop-up message of the type illustrated in FIGS. 3-5, or any other suitable type of graphic or message displayed in the web-based or app-based digital banking system. Notification messages from the digital banking systems may also be provided as push notifications to the customer's mobile device, emails, etc.

After providing the notification message at the box 626, or if no notification was warranted at the decision diamond 624, the process returns to the box 604 to record another customer action. The process of score points accrual and level tracking may continue for many loops within a single customer login session, and begins again each time the customer uses the digital banking system.

As outlined earlier, other steps may be taken in relation to the customer's digital banking score and level—such as providing rewards or offers associated with the score or level. These steps, if they are included, may be handled in a manner similar to the decision diamond 624 and the box 626.

The method for computing a digital banking score and usage level for a customer, diagrammed on FIG. 6, is performed for each customer who uses the digital banking systems. That is, each customer has his or her own individual score and level, which are tracked and managed as data associated with the customer's accounts at the bank business.

It is to be understood that the method of FIG. 6 is programmed as an algorithm which runs on the computing system 206 (the enterprise server) cooperatively and interoperably with the computing device 104 and/or the mobile device 106 (or 300) of the customer. These devices all include processors, memory and communication modules suitable to run the algorithm and perform the digital banking score and level tracking in the manner described throughout the present disclosure.

The method and system for computing a digital banking score and usage level for a customer, discussed above, provides features for encouraging customer usage of web-based or app-based digital banking systems which promote increased use of the digital systems. This directly benefits the bank business by decreasing the need for customer branch office visits, and benefits the customer by making their banking transactions more convenient, which in turn leads to increased customer satisfaction and further growth of the bank business.

Particular embodiments and features of the disclosed methods and systems have been described with reference to the drawings. It is to be understood that these descriptions are not limited to any single embodiment or any particular set of features. Similar embodiments and features may arise or modifications and additions may be made without departing from the scope of these descriptions and the spirit of the appended claims.

What is claimed is:

1. A system for forming a connection between a user computing device and a server computer, said system comprising:
   a user computing device comprising at least one processor, a memory and a communication device; and
   a server computer with at least one processor, a memory, and a communication device, said server computer being in communication with the user computing device,
   wherein the user computing device is configured to:
      detect that an action has occurred, performed by the user using the user computing device, in an action list; and
      transmit the determination that the action has occurred from the user computing device to the server computer;
   wherein the server computer is configured to:
      receive the transmission from the user computing device that the action has occurred;
      in response to receiving the transmission, trigger an algorithm stored in the server computer to analyze the action, the algorithm configured to cause the server computer to:
         compute a base score and a score supplement corresponding to the action, the computation being based at least in part on an action type and the action list;
         determine that the score supplement has a data format identical to the base score such that they may be combined;
         in the event that the score supplement has a data format different than the base score, transform the score supplement based on a desired data format corresponding to the base score;
         upon determination that the score supplement has a data format identical to the base score, combine the score supplement with the base score, thereby resulting in a net score corresponding to the action detected by the user computing device;
         retrieve a current value of a user score from a user score database;
         combine the net score with the current value of the user score, thereby resulting in a new value of the user score corresponding to a plurality of former actions and the detected action;
         retrieve a user level from the user score database;
         retrieve a points-level threshold from a variables database;
         increment the retrieved user level by one when the new value of the user score exceeds the points-level threshold, thereby resulting in updates to the user level;
         continuously track the updates to the user level and compare the updates in real-time to the retrieved points-level threshold;
         determine, based on the comparison, that the updated user level has surpassed the points-level threshold; and
         in response to determining the updated user level has surpassed the points-level threshold, transmit control signals configured to cause the user computing device to display the new value of the user score and the updated user level on the user computing device;
wherein the user computing device is configured to:
receive the transmission from the server computer;
in response to receiving the transmission from the server computer:
initiate an algorithm to cause the user computing device to store the new value of the user score and the updated user level;
initiate display of the new value of the user score and the updated user level on a display component of the user computing device; and
initiate a notification message on the user computing device when notification criteria are met.

2. The system according to claim 1 wherein the user computing device is a tablet device or a smart phone configured with a mobile application which communicates with the server computer.

3. The system according to claim 1 wherein the user computing device is a computer configured with a web browser application which communicates with the server computer.

4. The system according to claim 1 wherein the system is part of a digital banking system in which the user has access to and control of one or more accounts.

5. The system according to claim 4 wherein the action is a transaction or a non-transactional operation involving one or more of the accounts, and the action is selected from a list including viewing account information, transferring funds, paying bills, depositing checks, and using a third-party electronic payment service.

6. The system according to claim 1 wherein computing a base score for the action includes computing a base score which is dependent upon the action type and how many times the action type appears in the action list.

7. The system according to claim 1 wherein computing a score supplement for the action includes computing a score supplement when a number of actions performed by the user within a defined timeframe exceeds an action-count threshold.

8. The system according to claim 1 wherein computing a score supplement for the action includes computing a score supplement when a number of action types performed by the user within a defined timeframe exceeds an action-type-count threshold.

9. The system according to claim 1 wherein computing a score supplement for the action includes computing a score supplement when a predefined checklist of different action types is completed by the user.

10. The system according to claim 1 wherein initiating a notification message includes providing a notification message selected from a list including notification of a level upgrade achieved, notification of a number of points needed to achieve a level upgrade, notification of the user parameter, and suggestion of an action type and a corresponding increase in the user parameter.

11. The system according to claim 1 further comprising providing rewards or incentives to the user based on the new value of the user score and the user level.

* * * * *